United States Patent [19]

Foster

[11] Patent Number: 4,932,466
[45] Date of Patent: Jun. 12, 1990

[54] RELAY PANEL AND SYSTEM FOR CONTROLLING ZONED HEATING AND COOLING SYSTEMS

[75] Inventor: Richard Foster, Clifton, N.J.
[73] Assignee: Trol-A-Temp, Elmwood Park, N.J.
[21] Appl. No.: 295,894
[22] Filed: Jan. 11, 1989
[51] Int. Cl.[5] ............................................. F25B 29/00
[52] U.S. Cl. ..................................... 165/16; 236/49.3
[58] Field of Search ................ 236/49 D; 165/16, 22, 165/26

[56] References Cited

U.S. PATENT DOCUMENTS

| | | | |
|---|---|---|---|
| 4,515,306 | 5/1985 | Grant | 165/22 X |
| 4,522,116 | 6/1985 | Tartagino | 236/46 R |
| 4,530,395 | 7/1985 | Parker et al. | 236/1 C X |
| 4,673,029 | 6/1987 | Beachboard | 165/22 |

Primary Examiner—William E. Wayner
Attorney, Agent, or Firm—McGlew & Tuttle

[57] ABSTRACT

A zoned heating and cooling system is controlled by a relay panel with a controlling thermostat in a first zone, and an additional thermostat in each additional zone. A relay corresponding to each first and additional zone, a relay to control the mode in which the system operates, and a fan relay, work in conjunction with the thermostats to: turn on system heating or cooling equipment; open dampers to provide conditioned air to those zones which call for heating or cooling; close dampers to block conditioned air from entering the zones which do not call for heating or cooling, when other zones do call; open all dampers when there is no calling; and provide for the manual or automatic control of a system fan.

6 Claims, 4 Drawing Sheets

RELAY PANEL AND SYSTEM FOR CONTROLLING ZONED HEATING AND COOLING SYSTEMS

FIELD OF THE INVENTION

The invention relates, in general, to systems for controlling zoned heating and cooling systems and, in particular, to a new and useful relay panel for controlling zoned heating and cooling systems which requires only a minimum of contacts for, thermostats and power inputs and, damper control outputs, and further eliminates the need for a separate system selector switch which is required as part of the circuitry with prior heating and cooling control systems.

BACKGROUND OF THE INVENTION

Similar systems for controlling heating and cooling systems are shown in U.S. Pat. No. 4,522,116 and 4,530,395, however, these require a separate manually-controlled system selector switch to change the system from the heating mode to the cooling mode, and require more system input and output contacts.

SUMMARY OF THE INVENTION

The present invention provides a relay panel for the control of a zoned heating and air conditioning systems. The panel is capable of controlling a standard single stage heating and cooling system and can also be adapted to control a heat pump system. Using standard types of thermostats the system allows control of a number of zones at individual temperatures. The first zone thermostat is advantageously a standard heating-cooling controlling thermostat with a switching sub-base for lo heating and cooling and is advantageously provided with terminals for switching to change the system from heating to cooling mode. The sub-base preferably includes a terminal to signal the panel for continuous or automatic fan operation. The thermostats in all the other zones are e.g. any other standard three-wire, single pole, double throw (SPDT) thermostat. The panel can also function with various types of automatic clock type thermostats. From the signal received from the thermostats, the panel will operate for heating or cooling and cycle the damper open to the zones that are calling for heating or cooling, and cycle the damper closed to the zones that are not calling. When both zones are not calling, the panel will automatically open all zone dampers to allow for continuous operation of the fan, if desired.

The zone 1 thermostat with switching sub-base is a heating-cooling thermostat with six wires. This thermostat will change the panel to either the heating or cooling mode and control the operation of the fan in the zone 1 damper to operate from the mode into which it is switched. The other thermostats will automatically operate in the same mode as the zone 1 controlling thermostat and control the operation of its own damper. When any zone calls for heating (or cooling), it will keep its zone damper open and automatically close the damper to the zone or zones that are not calling, while also closing a set of contacts to bring on the heating (or cooling unit). When all zone thermostats are calling, all zone dampers will open and operate the heating (or cooling unit). When all zone thermostats are satisfied, all zone dampers will open and the heating (or cooling) is shut off.

The fan switch on the zone controlling thermostat will control the operation of the system fan through the relay panel. By switching the fan switch to the "on" position, the relay panel will close a set of contacts to bring on the fan and allow it to run continuously, during the heating, off, and cooling modes. When the fan switch is in the "auto" position, the panel will only bring on the fan when the zone 1 thermostat is in the cooling mode and there is call for cooling from any of the zones. When the zone 1 thermostat is in the heating or off mode, the relay panel will not operate the fan.

The present embodiment includes a 24-volt, 40-volt-ampere transformer to provide the power to the relays and damper motors. One terminal from the transformer is a system common which provides power to one side of all the relay coils and to one terminal of the damper control mechanisms. The other terminal is the switched side of the transformer that will power the damper to either open or closed, based on the relay contact positions of each zone relay. When any zone relay is energized, the power is switched to the respective damper control mechanism terminal to open the damper. If any zone relay is de-energized, while the others are energized, the circuit will allow the energized zone relay dampers to open and the de-energized relay dampers to close. Another set of contacts on the relay panel closes when the zone relay energizes and will bring on the heating or cooling.

There is provided a relay panel for controlling a zone conditioned air supplying system comprising a first zone relay, at least one additional zone relay, a mode relay, and a fan relay, each having an energizing coil which, when energized, causes a number of switches to open normally closed contacts and close normally open contacts thereby changing the route an electric current may travel to cause the opening and closing of dampers and the activation of a system fan, and a cooling or heating apparatus.

Each of the first zone, additional zone, mode, and fan energizing coils having a first connection and an opposite second connection.

The first zone contains a sub-base, or controlling, thermostat on which controls are provided to turn on a fan, and/or to select the mode in which the system will function (e.g. heating, cooling, or off). Each of the additional zones contain an additional zone thermostat. The additional zone thermostats and the controlling thermostat each have a common terminal, a non-calling terminal and a calling terminal.

Depending on which mode is selected, the calling terminal becomes a non-calling terminal and vice versa.

Each thermostat also has a double-throw thermally regulated connector which is electrically connected at one end to the thermostat common connection and free to move at the opposite end according to the temperature condition in that particular zone. For example, the present invention advantageously provides a bi-metallic strip for this purpose. In a first position, the connector is electrically connected to the non-calling terminal and in a second position, the connector is electrically connected to the calling terminal.

In the present embodiment, a control power source advantageously provides an electric current to each relay energizing coil according to system conditions. A first terminal of the control power source is electrically connected to the first connection of each relay. A second terminal of the control power source is electrically connected to one end of an electrical connection. The opposite end of the electrical connection is electrically connected to the controlling thermostat common connection.

Also advantageously provided for each zone is a damper control mechanism for controlling the angular position of damper blades, with an opening terminal, a closing terminal, and an opposite terminal which is electrically connected to the first terminal of the controlling power source. Each damper control mechanism controls at least one damper which, when opened, allows system air to flow into a zone, and when closed, blocks system air from flowing into the zone.

When current from the second terminal of the control power source is allowed to flow to the opening terminal of the damper control mechanism through the proper switching, the damper control opens the damper. Similarly, when current is allowed to flow to the closing terminal, the damper closes.

Each of the relays has a plurality of switches, the first and second switches of the first and the at least one additional zone relays, when properly switched, will supply current to the appropriate terminals of the damper controls. Each switch having a common connection, a de-energized connection and an energized connection. A connector is electrically connected at one end to the common connection and at the opposite end electrically connected in a de-energized or normally closed position to the de-energized connection and connected at the opposite end to the energized connection in an energized or not normally closed position.

All of the zone relays have a first and a second switch which control the supply of power to the damper control mechanism. All of the zone relays first switch common connection is electrically connected to the power source directly or indirectly. According to the preferred embodiment, they are . connected to the common terminal of the controlling thermostat.

The de-energized connection or that connection which is normally closed with the common connection is electrically connected to the common connection of the second switch of all the other zone relays.

The energized connection of the first switch of all the zone relays or that connection which is normally open, thereby does not allow current to pass from the common connection to the de-energized connection such that it is electrically connected to the opening terminal of the damper control which corresponds to the same zone relay.

The energized connection of the second switch of all the relays is connectable to the closing terminals of the damper controls of all the other zone relays.

The de-energized connection of the second switch of all the zone relays is electrically connected to the opening terminal of the other damper control mechanism.

OBJECTS OF THE INVENTION

It is an object of the invention to eliminate the need for a separate system selector switch while still providing for the switching from the heating mode to the cooling mode as desired, by utilizing a more efficient wiring and switching system.

It is another object of the invention to provide all basic functions for a simple multi-zone heating and cooling system with a minimum of contacts for, thermostat and power inputs and, heating and cooling unit damper outputs.

It is a further object of the invention to provide a relay panel which can be used on any central heating and cooling system which may be divided into two or more zones. The arrangement according to the invention allows for better temperature control of each zone and reduced energy consumption due to only heating or cooling one zone at a time. The relay panel is used in conjunction with one thermostat in each zone and one or more air-controlling dampers for each zone. The zone thermostats will open and close the dampers based on the zone thermostats respective settings.

A further object of the invention is to provide a relay panel for controlling zoned heating and cooling systems which is simple in design, rugged in construction, and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DESCRIPTION OF THE PREFERRED EMBODIMENT

Figure 1:
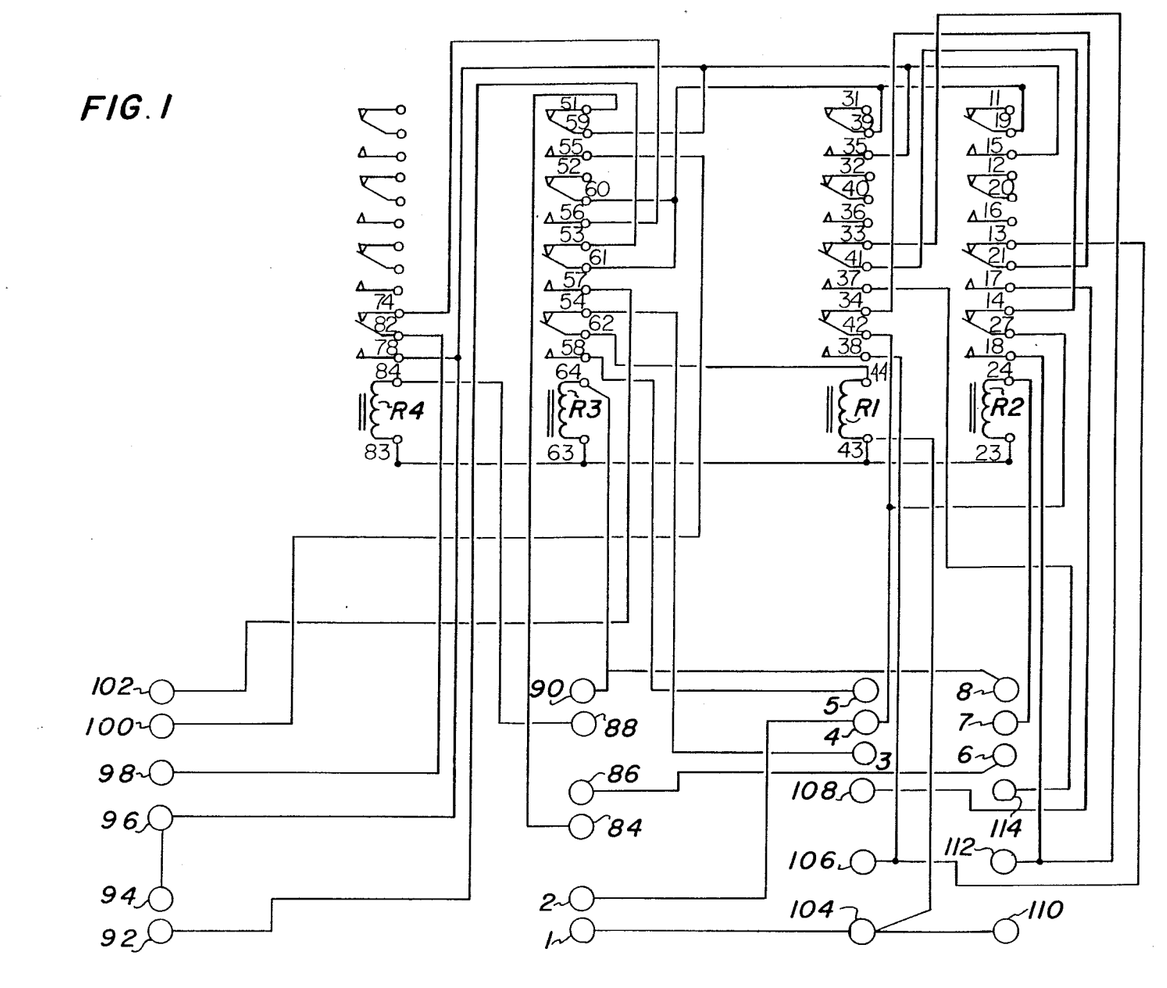
FIG. 1 is a circuit diagram showing the interior wiring of a relay panel with four attached relays for controlling a two-zone heating or cooling system with the relay switches in their normally closed position constructed in accordance with the invention.

Referring to the drawings, in particular, the invention embodied therein includes an interior circuitry of a relay panel as shown in FIG. 1 showing also four attached relays $R_1$, $R_2$, $R_3$, and $R_4$. Each of the relays includes twelve switching connections labelled: 11 to 22, 31 to 42, 51 to 62, and 71 to 82, respectively. These are shown in all in their normally closed positions. For example, connection 11 is normally connected to connection 19, connection 12 is normally connected with connection 20, connection 13 with connection 21, etc. Each relay has an energizable switch with two connections each, labelled 23 and 24, 43 and 44, 63 and 64, 83 and 84. When the switches experience a voltage across their connections, all the normally closed switches in the corresponding relay open and all the normally open switches close. For example, if the zone 1 relay $R_2$ experiences a voltage across connections 23 and 24, connection 19 breaks with connection 11, 20 breaks with 12, 21 breaks with 13, and 22 breaks with 14, and makes with connection 15, 16, 17, and 18 respectively.

Figure 2:
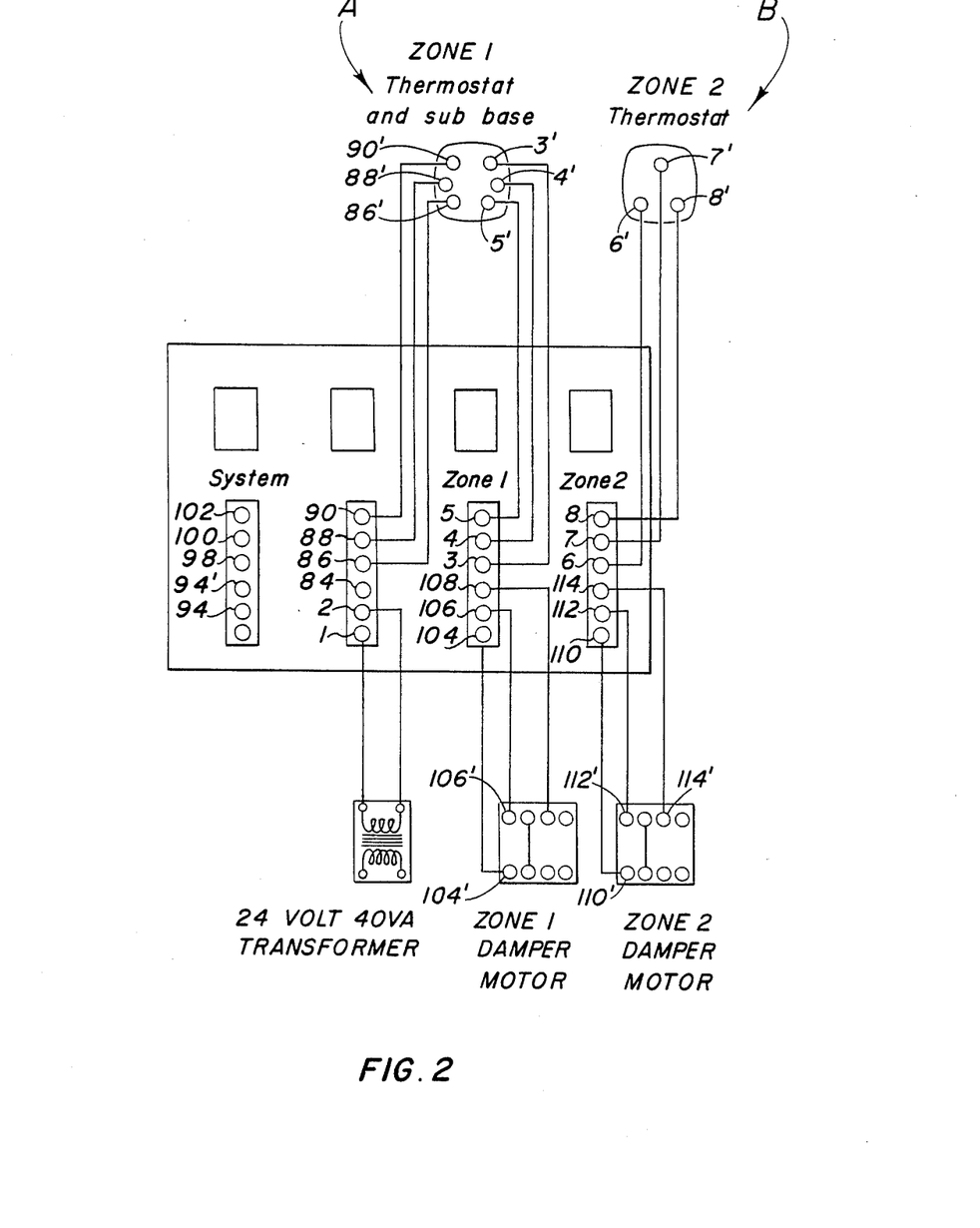
FIG. 2 is a schematic drawing of the exterior of the relay panel shown in FIG. 1.
Figure 3:
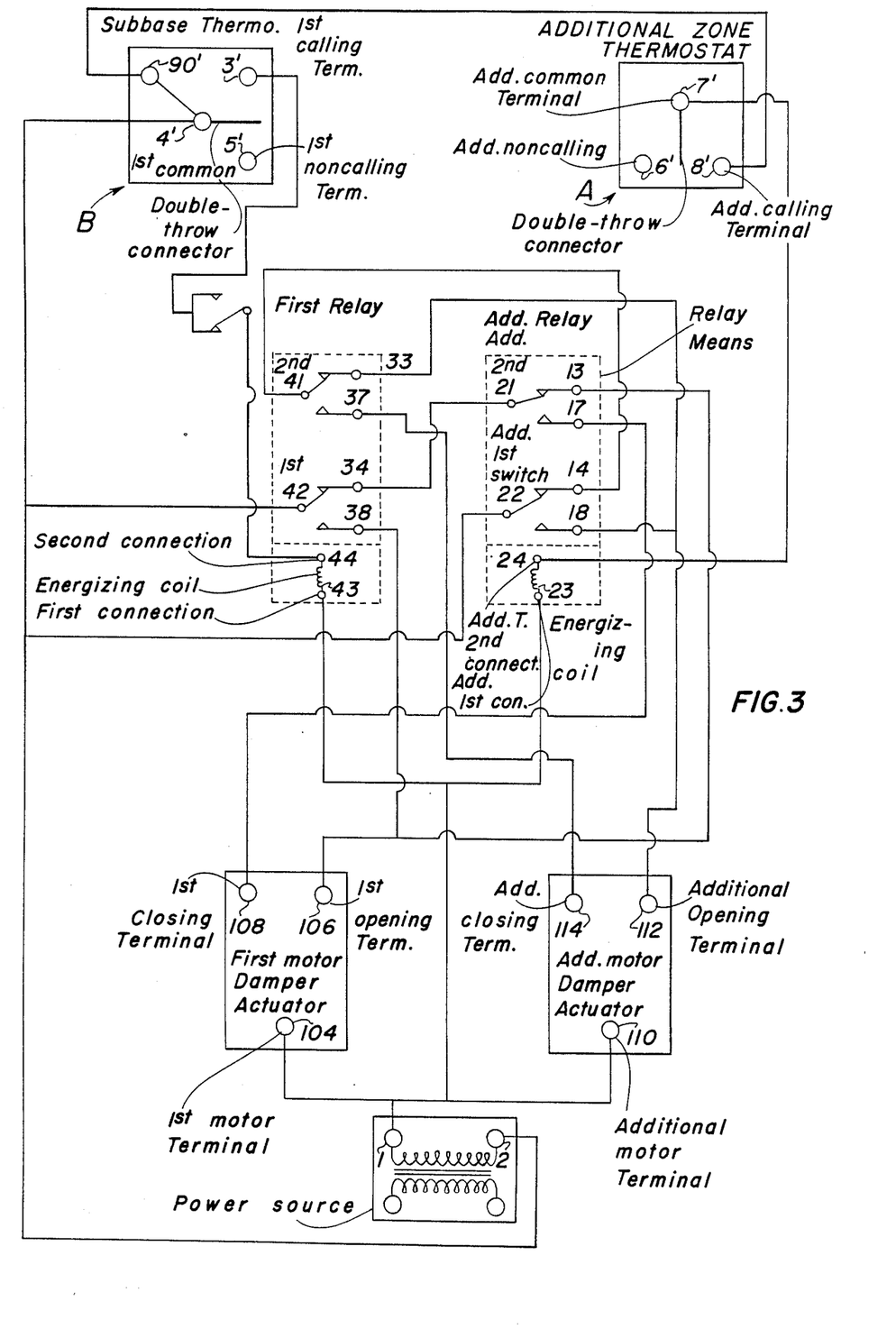
FIG. 3 is schematic circuit diagram showing the internal wiring of the relay panel with portions of attached relays showing only the wiring necessary to operate the dampers parts of the system circuitry are omitted for clarity.

FIGS. 2 and 3 show a zone 1 single pole double-throw (SPDT) thermostat, generally designated A, with six circuit points on the panel. These circuit points are also shown in FIG. 1 with like reference numerals.

FIGS. 2 and 3 also show a zone 2 (SPDT) thermostat, generally designated B, with three connections, common connection 7,, heating calling and cooling non-calling connection 6' and cooling calling and heating non-calling connection 8' connected to corresponding points 6, 7 and 8 on the relay panel.

Power to energize the relays is provided from the voltage which exists across the controlling power source terminals 1 and 2. One side of the damper controlling mechanisms and one side of all the relays are connected to terminal 1 of the transformer.

Power to run the air-conditioning compressor, the fan, and the heater is supplied from the system transformer 94, 94'.

Figure 4:
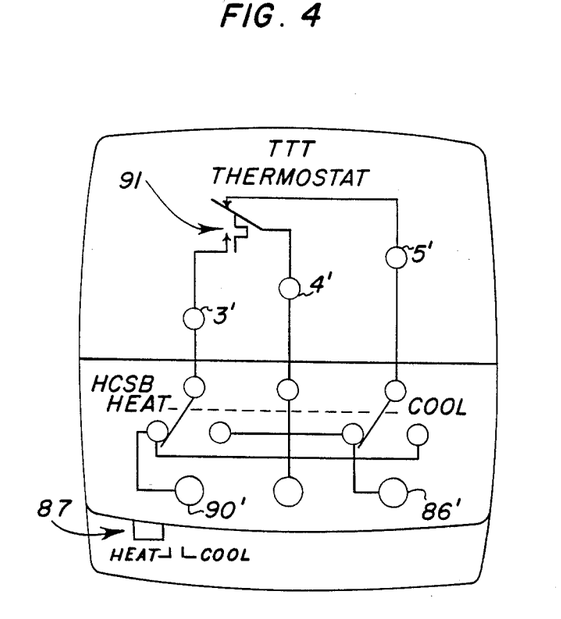
FIG. 4 is a schematic diagram of the internal wiring of the heating and cooling subbase of FIG. 2.

Referring to FIG. 2, it is shown that the heating or cooling mode is manually selected from the thermostat controlling with sub base in zone 1 by choosing 86' or 90' respectively. This may be accomplished by switch 87 (see FIG. 4).

Referring now to FIGS. 1 and 2 which show how the system fan is also manually controlled from the same zone 1 thermostat by throwing a switch controlling circuit point 88' which energizes circuit point 88 which energizes fan relay $R_4$ causing common connection 82 to break with de-energized connection 74 and, make with connection 78, thereby connecting the system fan 98 with system transformer 94 and supplying the fan 98 with power.

When the heating mode is selected by providing power to circuit terminal 86'by throwing a standard subbase switch (not shown) the system heater will turn on provided either one or both of two thermostats in either one or both zones call for heat. For example, if the thermostat in zone 1 calls for heat, circuit point 4 will make with circuit point 3 via common point 4' and calling point 3' (This is accomplished by thermostatically actuated switch 91 show in FIG. 4). in the thermostat in zone 1 will energize relay $R_1$ via circuit points 2, 4, 3 and connections 54, 62 and 44. This causes connection 39 to break with connection 31 and make with connection 35 enabling power from the system transformer 94 to run the heater 92 via connections 35, 39, 61, and 53.

Opening terminal 106 must receive power to open the damper controlling the flow of heated air into zone 1, while closing a damper in zone 2 by energizing closing terminal 114. Opening terminal 106 receives power from the controlling power source terminal 2 via connections 42 and 38 which were made by the above-described energizing of zone relay $R_1$. Closing terminal 114 receives power from terminal 2 via connections 22, 14, 41, and 37.

When zone 2 calls for heating and zone 1 does not, circuit point 7 makes with circuit point 6 which, because 86' and therefore 86 were selected, energizes relay $R_2$ via connection 24. When this occurs, connection 19 makes with 15 enabling power from the system transformer 94 to run the heater 92 via connection points 15, 19, 61, and 53.

The energizing of relay $R_2$ also opens the damper supplying air to zone 2 by enabling terminal 2 to supply power to opening terminal 112 via connections 22, and 18, and closes the damper supplying zone 1 by energizing closing terminal 108 via points 2, 4, and connections 42, 34, 21 and 17.

When both zones call for heating, relay $R_1$ and relay $R_2$ will be energized. When this occurs, connection 19 makes with connection 15, and connection 39 makes with connection 35 enabling power from the system transformer 94 to turn on the heater 92 via either one or both of connection 15, 19 and/or 35, 39, and via connections 61 and 53. Both dampers will open due to both circuit point 106, and circuit point 112 receiving power from the transformer terminal 2 via circuit point 4, and connection points 42, 38, and/or connection points 22, 18, respectively.

When neither zone calls for heat, and relays R1 and R2 are not energized, both dampers will open. The damper in zone 1 will open from power via power source terminal 2, circuit point 4, connections 42, 34, 21, 13 and opening terminal 106. The damper controlling air supplied to zone 2 will open from power via the path 2, 4, 22, 14, 41, 33, 112.

When the cooling mode is manually selected on the zone 1 controlling thermostat and sub-base, circuit point 90 is energized which energizes mode relay R3 via connection 64.

When zone 1 calls for cooling and zone 2 does not, circuit point 4 makes with circuit point 5 via common terminal 4' and cooling calling terminal 5' respectively in thermostat 1. This supplies power from terminal 2 to energize relay R1 via the path 2, 4, 5, 58, 62, and 44, which opens the zone 1 supply damper and closes the zone 2 supply damper as described above.

When zone 2 calls for cooling and zone 1 does not, circuit point 7 makes with circuit point 8 which, because point 90 was energized, becomes energized as well which energizes relay R2 via connection 24. This opens the zone 2 supply damper and closes the zone 1 supply damper also as described above.

When cooling is manually selected and mode relay R3 is energized as noted, the compressor 102 will receive power from the system transformer 94 as long as relay R1 and/or relay R2 are energized. The power path then becomes 94, 15, 19, 61, 57, and 102 and/or 94, 35, 39, 61, 57, 102.

Also note that if the cooling mode is selected when the fan has not been manually turned on, the fan will automatically be turned on when either or both of zone or zone 2 call for cooling and, consequently, either or both of relay R1 and relay R2 are energized respectively. This is accomplished via the power path 94, 15, 19, 60, 56, 74, 82, and 98, and/or the power path 94, 35, 39, 60, 56, 74, 82, 98.

When both zones call for cooling and circuit point 7 makes with circuit point 8 and circuit point 4 with circuit point 5, and relays R1 and R2 are energized as described above, both dampers open, powered as they are in the case of both zones calling for heating. Similarly, both dampers open when neither zone calls for cooling, as both dampers open when neither zone calls for heating as described above.

While a specific embodiment of the invention has been shown and described in detail to illustrate the application of the principles of the invention, it will be understood that the invention may be embodied otherwise without departing from such principles.

What is claimed is:

1. A relay panel and system for controlling a zoned conditioned air supply comprising:
   a first zone relay having an energizing coil with an energizing means;
   at least one additional zone relay having an additional energizing coil with an additional energizing means;
   a controlling thermostat in a first zone having a common terminal, a non-calling terminal, a calling terminal, a thermally-regulated connector with a first end electrically connected to said common terminal and a second end electrically connected in a first position to said non-calling terminal and electrically connected in a second position to said calling terminal;

at least one additional zone thermostat in at least one additional zone and having an additional common terminal, an additional non-calling terminal, an additional calling terminal, an additional thermally-regulated connector with a first end electrically connected to said additional common terminal end, a second end electrically connected in an additional first position to said additional non-calling terminal and electrically connected in an additional second position to said additional calling terminal;

a power source having a first terminal and a second terminal, an electrical connection electrically connecting said power source second terminal to said common terminal;

said additional calling terminal electrically connected to said common terminal;

a first damper control having an opening terminal, a closing terminal, and an opposite terminal;

at least one additional damper control having an additional opening terminal, an additional closing terminal, and an additional opposite terminal;

said opposite terminal and said additional opposite terminal electrically connected to said power source first terminal;

said first zone relay having a first switch, and a second switch;

said at least one additional relay having an additional first switch, and an additional second switch;

each of said first and said second switches and said additional first and said additional second switches having a common connection, a de-energized connection, and an energized connection, and having a connector with one end electrically connected to said common connection and an opposite end electrically connected to said de-energized connection in a de-energized position and connected to said energized connection in an energized position;

said first switch common connection being electrically connected to said sub-base thermostat common terminal, said first switch de-energized connection between electrically connected to said additional second switch common connection, said first switch said energized connection being electrically connected to said first damper control opening terminal, said additional second switch de-energized connection being electrically connected to said first damper control opening terminal, said additional second switch energized connection being electrically connectible to said first damper control closing terminal, said additional first switch common connection being electrically connected to said control thermostat common terminal, said additional first switch de-energized connection being electrically connected to said second switch common terminal, said additional first switch energized connection being electrically connected to said additional damper control opening terminal, said second switch de-energized connection being electrically connected to said additional damper control opening terminal, said second switch energized connection being electrically connectible to said additional damper control closing terminal;

means for moving said double throw connector into said second position and activating said energizing means causing said first switch common connection to electrically connect with said first switch energized connection and providing electric current to said first damper control opening terminal, and causing said second switch common connection to electrically connect with said second switch energized connection making electric current providable to said at least one additional damper control closing terminal;

an additional means for moving said additional double throw connector into said additional second position and activating said additional energizing means causing said additional first switch common connection to electrically connect with said additional first switch energized connection and providing electric current to said additional damper control opening terminal, and causing said second switch common terminal to electrically connect with said second switch energized terminal.

2. A relay panel according to claim 1, further comprising:

a system power source;

a fan activator;

said first zone relay and said at least one additional zone relay each having a third normally open switch;

a normally open fan power switch having an activatable closing means;

a fan relay having a fan relay energizing coil with a fan relay energizing means, a fan switch;

said fan switch having a fan common connection, a fan de-energized connection, a fan energized connection, said fan common connection electrically connected to said fan activator, said fan de-energized connection electrically connected to said normally open cooling relay switch closeable upon activation of said closing means to electrically connect said fan switch de-energized connection to at least one of said first zone relay and at least one additional zone relay third normally open switch closeable upon energization of at least one of said first zone relay coil and at least one additional zone relay coil electrically connecting said system power source to said fan activator.

3. A relay panel according to claim 1, further comprising:

a system power source, a heating activator, a cooling activator, a cooling compressor;

a mode relay with a mode relay energizing coil with an mode relay energizing means;

a cooling circuit point electrically connectable to said controlling power source;

a first mode switch with a first common connection; a first de-energized connection, a first energized connection;

a second mode switch with a second common connection, a second de-energized connection, a second energized connection;

said fan power switch being a third mode switch with a third common connection, a third deenergized connection;

a fourth mode switch with a fourth common connection, a fourth deenergized connection, a fourth energized connection;

said first common connection electrically connected to activate said first zone relay energizing coil energizing means;

said first de-energized connection electrically connected to one of said control thermostat calling terminal and non-calling terminal, said first energized connection electrically connected to the other of said control thermostat calling terminal and non-calling terminal;

said second common connection electrically connectable to said system power source, said second de-energized connection electrically connected to said heating activator, said second energized connection electrically connected to said cooling compressor;

said third common connection electrically connectable to said system power source, said third energized connection electrically connected to said fan relay de-energized connection;

said fourth common connection electrically connectable to said system power source, said four&h energized connection electrically connected to said cooling activator.

4. A relay panel and system for controlling a zoned conditioned air supply comprising:

a first zone relay having an energizing coil with a first connection and a second connection;

at least one additional zone relay having an additional energizing coil with an additional first connection and an additional second connection;

a controlling thermostat in a first zone having a common terminal, a non-calling terminal, calling terminal, a thermally-regulated connector with a first end electrically connected to said common terminal and a second end electrically connected in a first position to said non-calling terminal and electrically connected in a second position to said calling terminal;

at least one additional zone thermostat in at least one additional zone and having an additional common terminal, an additional non-calling terminal, an additional calling terminal, an additional thermally regulated connector with a first end electrically connected to said additional common terminal end, a second end electrically connected in an additional first position to said additional non-calling terminal and electrically connected in an additional second position to said additional calling terminal;

a power source having a first terminal electrically connected to said first connection of said first zone relay and electrically connected to said additional first connection of said at least one additional relay, said power source having a second terminal, an electrical connector electrically connecting said power source second terminal to said common terminal;

said additional calling terminal electrically connected to said common terminal;

a first damper control having an opening terminal, a closing terminal, and an opposite terminal;

at least one additional damper control having an additional opening terminal, an additional closing terminal, and an additional opposite terminal;

said opposite terminal and said additional opposite terminal electrically connected to said power source first terminal;

said first zone relay having a first switch, and a second switch;

said at least one additional relay having an additional first switch, and an additional second switch;

each of said first and said second switches and said additional first and said additional second switches having a common connection, a de-energized connection, and an energized connection, and having a connector with one end electrically connected to said common connection and an opposite end electrically connected to said de-energized connection in a de-energized position and connected to said energized connection in an energized position;

said first switch common connection being electrically connected to said sub-base thermostat common terminal, said first switch de-energized connection between electrically connected to said additional second switch common connection, said first switch said energized connection being electrically connected to said first damper control opening terminal, said additional second switch de-energized connection being electrically connected to said first damper control opening terminal, said additional second switch energized connection being electrically connectable to said first damper control closing terminal, said additional first switch common connection being electrically connected to said control thermostat common terminal, said additional first switch de-energized connection being electrically connected to said second switch common terminal, said additional first switch energized connection being electrically connected to said additional damper control opening terminal, said second switch de-energized connection being electrically connected to said additional damper control opening terminal, said second switch energized connection being electrically connectable to said damper control closing terminal;

said first zone relay second connection being electrically connected to said control thermostat calling terminal;

said at least one additional zone relay additional second connection being electrically connected to said at least one additional thermostat additional common terminal;

means for moving said double throw connector into said second position providing electric current to energize said first relay causing said first switch common connection to electrically connect with said first switch energized connection and providing electric current to said first damper control opening terminal, and causing said second switch common connection to electrically connect with said second switch energized connection making electric current providable to said at least one additional damper control closing terminal;

an additional means for moving said additional double throw connector into said additional second position providing power to energize said at least one additional relay causing said additional first switch common connector to electrically connect with said additional first switch energized connection and providing electric current to said additional damper control opening terminal, and causing said second switch common terminal to electrically connect with said second switch energized terminal.

5. A relay panel according to claim 4, further comprising:

a system power source;

a fan activator;

said first zone relay and said at least one additional zone relay each having a third normally open switch;

a normally open fan power switch having an activatable closing means;

a fan relay having a fan relay energizing coil with a fan relay first connection, a fan relay second connection, a fan switch;

said fan switch having a fan common connection, a fan de-energized connection, a fan energized connection, said fan common connection electrically connected to said fan activator, said fan de-energized connection electrically connected to said normally open cooling relay switch closeable upon activation of said closing means to electrically connect said fan switch de-energized connection to at least one of said first zone relay and at least one additional zone relay third normally open switch closeable upon energization of at least one of said first zone relay coil and at least one additional zone relay coil electrically connecting said system power source to said fan activator.

6. A relay panel according to claim 4, further comprising:

a system power source, a heating; activator, a cooling activator, a cooling compressor;

a mode relay with a mode relay energizing coil, said mode relay energizing coil having a first mode relay connection electrically connected to said controlling power source first terminal, a second mode relay connection;

a cooling circuit point electrically connectable to said controlling power source and electrically connected to said mode relay second connection;

a first mode switch with a first common connection; a first deenergized connection, a first energized connection;

a second mode switch with a second common connection, a second de-energized connection, a second energized connection;

said fan power switch being a third mode switch with a third common connection, a third deenergized connection;

a fourth mode switch with a fourth common connection, a fourth deenergized connection, a fourth energized connection;

said first common connection electrically connected to said first zone relay energizing coil second connection; said first de-energized connection electrically connected to one of said control thermostat calling terminal and non-calling terminal, said first energized connection electrically connected to the other of said control thermostat calling terminal and non-calling terminal;

said second connection electrically connectable to said system power source, said second de-energized connection electrically connected to said heating activator, said second energized connection electrically connected to said cooling compressor;

said third common connection electrically connectable to said system power source, said third energized connection electrically connected to said fan relay de-energized connection;

said fourth common connection electrically connectable to said system power source, said fourth energized connection electrically connected to said cooling activator.

* * * * *